United States Patent Office 2,967,874
Patented Jan. 10, 1961

2,967,874

PROCESS FOR INCREASING THE CHAIN LENGTH OF LEVULINIC ACID

Johann Giesen, Haldenstein, near Chur, and Wilhelm Deiters, Chur, Switzerland, assignors to Inventa A.G. für Forschung und Patentverwertung, Zurich, Switzerland No Drawing. Filed June 8, 1959, Ser. No. 818,503

Claims priority, application Germany July 10, 1956

3 Claims. (Cl. 260—413)

This invention relates to the utilization of levulinic acid by a lengthening of its chain and conversion into other compounds which, among other purposes, are of particular interest with respect to the manufacture of plastics and synthetic fibers. The present invention is a continuation-in-part of our co-pending application S.N. 669,693, filed July 3, 1957, now abandoned.

Levulinic acid has hardly found any industrial application to date and its conversion into commercially useful products by the simple expedient of lengthening its chain has not been practiced.

It has now been found quite surprisingly that it is possible to increase the chain length of levulinic acid and to obtain novel products in good yield by the method described below. This method consists in converting levulinic acid into the α-β-unsaturated, comparatively stable acetoacrylic acid which is then condensed with different aldehydes or ketones in ω-position whereby, due to elimination of water, doubly unsaturated γ-keto acids are obtained. The doubly unsaturated keto acids may, in turn, be converted into completely saturated alkylcarboxylic acids or into hydroxy acids by catalytic hydrogenation.

The conversion of levulinic acid into acetoacrylic acid is done in a simple manner by first effecting a substitution with halogen according to a known process, whereby a halogenated keto acid is obtained; from this acid, acetoacrylic acid is easily obtained by splitting off a hydrogen halide.

Acetoacrylic acid is a compound which readily lends itself to condensation and may be reacted with a great number of various carbonyl compounds, yielding compounds which correspond to the following formula:

R—CH=CH—CO—CH=CH—COOH in which R stands for any desired radical.

In other words, acetoacrylic acid may be lengthened in ω-position by condensation with aldehydes, e.g., acetaldehyde, n- and isobutyraldehydes, substituted or unsubstituted aromatic aldehydes, such as benzaldehyde or furfural, and saturated or unsaturated ketones by any desired amount of carbon atoms. The condensation of acetaldehyde with acetoacrylic acid yields acetylidene acetoacrylic acid, the condensation with furfural, furfurylidene acetoacrylic acid, and so forth.

As condensing agent, the conventional alkaline compounds may be used, such as sodium amide or just alkalies. It is advantageous to use the alkaline condensing agents in low concentration, since thereby the decomposition of acetoacrylic acid can be prevented and the yield considerably increased.

The doubly unsaturated keto acids thus obtained may be converted by known methods of catalytic reduction into saturated keto acids, saturated hydroxy acids, or into R-alkylcarboxylic acids, wherein R may stand for an aryl or alkyl radical, depending on the type aldehyde used. When furfural is condensed with acetoacrylic acid, the furane ring can be split by known methods before carrying out the reduction, whereby an unsaturated dicarboxylic acid will be obtained.

The process according to the present invention thus facilitates a preparation of saturated carboxylic acids having 7 to 10 carbon atoms in a straight chain wherein, in one embodiment, an aromatic ring, e.g., a furane ring or a benzene ring may be included. The starting material is levulinic acid, and the formation of β-branched condensation products is forestalled. The process is carried out by substitution of chlorine for one hydrogen atom of the β-methylene group of the levulinic acid, followed by splitting HCl off the β-chlorolevulinic acid, e.g., by reaction with a sodium salt, thereby converting that acid into acetoacrylic acid. The latter is condensed with an aldehyde by the action of a basic alkali salt or hydroxide, and the carboxylic acid thus formed is saturated by catalytic hydrogenation. In the case of the aforementioned embodiment using furfural, hydrogenation is preceded by acidic splitting of the furane ring.

The invention will now be more fully described in a number of examples, but it should be understood that these are given merely by way of illustration, not of limitation, and that many changes in the details can be made without departing from the spirit and the scope of the invention as hereinafter claimed.

Example 1

240 g. of twice distilled levulinic acid, in a mixture of 670 ml. concentrated HCl and 130 ml. water, were treated with chlorine at a temperature of minus 8° C. until about 10% more than the theoretical amount of chlorine had been absorbed. The monochloride of the acid was obtained by extraction with ether from the solution at a yield of about 70%.

160 g. β-monochloro levulinic acid were heated together with 160 g. sodium acetate and 226 ml. glacial acetic acid for 40 minutes to 100° C. After adding this mixture to 2 liter water, the dilute acetic acid was evaporated in vacuo; the residue was dissolved in hydrochloric acid. The solution was extracted with ether and the extract evaporated. After evaporation of the solvent, white crystals of acetoacrylic acid remained, at a yield of about 65%, which after recrystallization from toluene had a melting point of 136° C.

0.88 mol acetoacrylic acid and 0.88 mol acetaldehyde in 40 ml. water were cooled to 0° C.; then 173 ml. 2.5% sodium hydroxide solution were added drop by drop within 30 minutes while stirring. After a further lapse of 30 minutes, a 7% solution of sulfuric acid was added until an acid reaction was obtained (indicator: Congo red).

The oil which had formed was extracted with ether; after drying and evaporation of the ether, the condensation product was recovered as a brown syrup. Yield: 55.5% of the theory.

This δ-acetylidene acetoacrylic acid was converted by hydrogenation into η-heptylic acid.

Example 2

Of the acetoacrylic acid obtained according to Example 1, 0.88 mol was reacted with 0.88 mol n-butyraldehyde under the same reaction conditions. After the addition of the entire sodium hydroxide, 10 more minutes were sufficient to complete the reaction. The oil separated with a small amount of flake-formation and was isolated by extraction with ether. In this manner, δ-butylidene acetoacrylic acid was obtained as brown oil at a 63.5% yield. The reaction product was converted by hydrogenation into n-nonylic acid.

Example 3

Of the acetoacrylic acid obtained according to Example 1, 10 mols together with 10 mols benzaldehyde in 450 ml. water were cooled to 0° C. Then 2 liters 2.5% sodium hydroxide solution were added dropwise in a vessel whose walls were well cooled, the addition taking about one hour and the solution being well stirred. After the addition was completed, the further reaction time was limited to 10 minutes. Subsequently the solution was neutralized with 1 liter 7% sulfuric acid until the reaction was acid (indicator: Congo red). An oil separated which was recovered by extraction with ether. The product obtained was δ-benzylidene acetoacrylic acid at a yield of 60.5%. By hydrogenation, E-cyclohexyl-n-caproic acid (often referred to in a simplified manner as ω-cyclohexylic acid) was obtained.

*Example 4*

Acetoacrylic acid was made on a commercial scale, as described in Example 1. In a reaction tube of appropriate length, a mixture of 10 mols acetoacrylic acid and 10 mols furfural in 450 ml. water was cooled to 0° C., and 2 liters of a 2.5% sodium hydroxide solution were gradually added in a constant stream. Time of addition was about 40 minutes, and the mixture was maintained for another 20 minutes in the tube for completion of the reaction.

To the brown solution formed about 1 liter 7% sulfuric acid was added, likewise in a constant stream, until the reaction was acid (indicator: Congo red), whereupon a lemon-yellow oily product separated. The δ-furfurylidene acetoacrylic acid was withdrawn into a vessel and, upon standing therein without stirring, a solid product formed which was filtered through a Buechner funnel by suction. After dissolving in ether, the product was washed in water, and soda solution was added thereto. The yellow sodium salt of the acid was filtered by suction, and 7% sulfuric acid was added thereto. This resulted in a crystalline acid amount to 62% of the theory. 100 grams of the δ-furfurylidene acetoacrylic acid were refluxed with 200 grams alcohol and 150 grams concentrated HCl for 2 to 3 hours. Thereafter, the mixture was evaporated to dryness on a water-bath, dissolved in water, and filtered from resins formed. By further purification, a crystalline white acid with a melting point of 160° C. was obtained, the analysis of which showed it to be diketo-octyl dicarboxylic acid unsaturated in α-position. The product was converted into sebacic acid by hydrogenation.

The hydrogenation in the above-described examples was carried out at pressures of 180–220 kg./cm.$^2$ and at temperatures of 260–300° C. using copper chromite as a catalyst.

The straight chain carboxylic acids obtained by the process according to the present invention are of interest as starting materials for the manufacture of plastics and synthetic fibers.

We claim as our invention:

1. A process of making saturated carboxylic acids having a straight chain of 7 to 10 carbon atoms from levulinic acid while precluding the formation of branched condensation products which comprises substituting one hydrogen atom in the β-methylene group of said levulinic acid with a chlorine atom, splitting HCl off the β-chlorolevulinic acid, thus formed, by action of a sodium salt thereon, thereby obtaining acetoacrylic acid; condensing the latter with an aliphatic aldehyde containing from 2 to 5 carbon atoms in a straight chain to a carboxylic acid by action of a basic medium, selected from the group consisting of alkali salts and alkali hydroxides, and saturating said carboxylic acid by hydrogenation.

2. A process of making saturated carboxylic acids having a straight chain of 7 to 10 carbon atoms from levulinic acid and furfural while precluding the formation of branched condensation products which comprises substituting one hydrogen atom in the β-methylene group of said levulinic acid with a chlorine atom, splitting HCl off the β-chlorolevulinic acid, thus formed, by action of a sodium salt thereon, thereby obtaining acetoacrylic acid, condensing the latter with furfural to a carboxylic acid by action of a basic medium, selected from alkali salts and alkali hydroxides, splitting the furane ring of said furfural at its oxygen bridge by boiling with alcoholic HCl, and saturating the resulting straight chain carboxylic acid by hydrogenation.

3. A process for making saturated carboxylic acids having a benzene ring and a straight chain of 7 to 10 carbon from levulinic acid while precluding the formation of branched condensation products which comprises substituting one hydrogen atom in the β-methylene group of said levulinic acid with a chlorine atom, splitting HCl off the β-chlorolevulinic acid, thus formed, by action of a sodium salt thereon, thereby obtaining acetoacrylic acid; condensing the latter with an aromatic aldehyde having a straight chain of at most 5 carbon atoms on its benzene ring to a carboxylic acid by action of a basic medium, selected from the group consisting of alkali salts and alkali hydroxides, and saturating said carboxylic acid by hydrogenation.

References Cited in the file of this patent

UNITED STATES PATENTS

| | | |
|---|---|---|
| 2,183,929 | Bowles et al. | Dec. 13, 1939 |
| 2,815,375 | Kamlet | Dec. 3, 1957 |

OTHER REFERENCES

Chemistry of Carbon Compounds, vol. 1$^B$, Rodd, page 885 (1952).